United States Patent

Rifi et al.

Patent Number: 5,106,927
Date of Patent: Apr. 21, 1992

[54] PROCESS FOR PRODUCING ETHYLENE/PROPYLENE/ETHYLIDENE NORBORNENE RUBBERS

[75] Inventors: Mahmoud R. Rifi, Kendall Park, N.J.; Kiu H. Lee, South Charleston; Mark J. Kriss, St. Albans, both of W. Va.; Han-Tai Liu, Belle Mead, N.J.

[73] Assignee: Union Carbide Chemicals & Plastics Technology Corporation, Danbury, Conn.

[21] Appl. No.: 405,286

[22] Filed: Sep. 11, 1989

[51] Int. Cl.$^5$ .................. C08F 2/34; C08F 236/20
[52] U.S. Cl. ................... 526/133; 526/125; 526/142; 526/153; 526/282; 526/901
[58] Field of Search .......... 526/901, 133, 142, 153, 526/282, 125

[56] References Cited

U.S. PATENT DOCUMENTS

| | | | |
|---|---|---|---|
| 4,259,468 | 5/1981 | Kajiura et al. | 526/282 X |
| 4,303,771 | 12/1981 | Wagner et al. | 526/125 |
| 4,343,926 | 8/1982 | Caumartin et al. | 526/68 |
| 4,677,172 | 6/1987 | Zimmerman et al. | 526/159 |
| 4,710,538 | 12/1987 | Jorgensen | 525/53 |
| 4,722,971 | 2/1988 | Datta et al. | 526/211 |
| 4,910,295 | 3/1990 | Bernier et al. | 528/482 |
| 4,958,006 | 9/1990 | Bernier et al. | 528/501 |

FOREIGN PATENT DOCUMENTS

0120503 4/1987 European Pat. Off.

Primary Examiner—Fred Teskin
Attorney, Agent, or Firm—Saul R. Bresch

[57] ABSTRACT

A process for the production of EPDM comprising reacting ethylene, propylene, ethylidene norbornene, and hydrogen, in the gas phase, in a fluidized bed, under polymerization conditions, in the presence of a catalyst system comprising:
(a) a titanium based catalyst having the formula $Mg_aTi(OR)_bX_c(ED)_d$ wherein
R is an aliphatic or aromatic hydrocarbon radical having 1 to 14 carbon atoms or COR' wherein R' is an aliphatic or aromatic hydrocarbon radical having 1 to 14 carbon atoms;
each OR group is alike or different;
each X is independently chlorine, bromine, or iodine
ED is an electron donor
a is 0.5 to 56;
b is 0, 1, or 2;
c is 2 to 116; and
d is greater than 1.5 a+2;
(b) at least one modifier having the formula $BX_3$ or $AlR_{(3-b)}X_b$ wherein each R is alkyl or aryl and is alike or different, and X and b are as defined above for component (a),
wherein components (a) and (b) are impregnated into an inorganic support; and
(c) a hydrocarbyl aluminum cocatalyst with the following proviso:
(i) the partial pressure of ethylene is in the range of about 10 to about 150 psi;
(ii) the molar ratio of propylene to ethylene is in the range of about 1.5:1 to about 5:1;
(iii) the molar ratio of hydrogen to ethylene is in the range of about 0.001:1 to about 0.1:1; and
(iv) the amount of ethylidene norbornene is about 1.5 to about 15 percent by weight based on the weight of the fluidized bed.

6 Claims, No Drawings

PROCESS FOR PRODUCING ETHYLENE/PROPYLENE/ETHYLIDENE NORBORNENE RUBBERS

TECHNICAL FIELD

This invention relates to ethylene/propylene/ethylidene norbornene rubbers (EPDM) and a process for its production.

BACKGROUND ART

EPDM is an elastomeric terpolymer used in such applications as hose and tubing, wire and cable, gaskets, and single ply roofing. It is generally formulated with fillers, oils, processing aids, and stabilizing agents, and cured by reacting the terpolymer with sulfur in the presence of accelerators or with a combination of sulfur and an organic peroxide such as dicumyl peroxide.

EPDM is produced commercially via batch solution or suspension processes in which complex and costly solvent recovery, separation, and de-ashing are required. These requirements are energy and labor intensive, which are reflected in high operating and investment costs. In order to reduce these costs, the production of EPDM in a gas phase fluidized bed reactor has been suggested, but this entails the selection of a proper catalyst formulation and operating conditions in order to provide an EPDM, which is equivalent in terms of physical properties to currently available EPDM's.

DISCLOSURE OF THE INVENTION

An object of this invention, therefore, is to provide a gas phase, fluidized bed process whereby an EPDM can be produced, which has physical properties equal or superior to commercially available EPDM's.

According to the present invention, a process has been discovered for the gas phase, fluidized bed production of EPDM, which not only produces an EPDM equivalent to commercially available EPDM's, but produces a structurally different EPDM having excellent physical properties. This process comprises reacting ethylene, propylene, ethylidene norbornene (ENB) and hydrogen in the gas phase, in a fluidized bed, under polymerization conditions, in the presence of a catalyst system comprising:

(a) a titanium based catalyst having the formula $Mg_aTi(OR)_bX_c(ED)_d$ wherein R is an aliphatic or aromatic hydrocarbon radical having 1 to 14 carbon atoms or COR' wherein R' is an aliphatic or aromatic hydrocarbon radical having 1 to 14 carbon atoms;

each OR group is alike or different;
each X is independently chlorine, bromine, or iodine;
ED is an electron donor;
a is 0.5 to 56;
b is 0, 1, or 2;
c is 2 to 116; and
d is greater than 1.5 a+2;

(b) at least one modifier having the formula $BX_3$ or $AlR_{(3-b)}X_b$ wherein each R is alkyl or aryl and is alike or different, and X and b are as defined above for component (a), wherein components (a) and (b) are impregnated into an inorganic support; and (c) a hydrocarbyl aluminum cocatalyst.

The process of this invention employs the following preferred conditions:

(i) the partial pressure of ethylene is in the range of about 10 to about 150 psi;

(ii) the molar ratio of propylene to ethylene is in the range of about 1.5:1 to about 5:1;

(iii) the molar ratio of hydrogen to ethylene is in the range of about 0.001:1 to about 0.1:1; and (iv) the amount of ENB is about 1.5 to about 15 percent by weight based on the weight of the fluidized bed.

DETAILED DESCRIPTION

The titanium based catalyst and its method for preparation are disclosed in U.S. Pat. No. 4,303,771 issued on Dec. 1, 1981, which is incorporated by reference herein.

The catalysts useful in the practice of the invention are prepared from a titanium compound, a magnesium compound, and an electron donor.

Titanium compounds, which are useful in preparing these catalysts, have the formula $Ti(OR)_bX_e$ wherein R, X, and b are as defined above for component (a); e is an integer from 1 to 4; and b+e is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$.

The magnesium compounds, which are useful in preparing these catalysts, include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor used in the catalyst is an organic Lewis base, liquid at temperatures in the range of about 0° C. to about 200° C., in which the titanium and magnesium compounds are soluble.

Examples of suitable electron donors are alkyl esters of aliphatic or aromatic carboxylic acids, aliphatic ketones, aliphatic amines, aliphatic alcohols, alkyl or cycloalkyl ethers, and mixtures thereof. It is preferred that the electron donors have from 2 to 20 carbon atoms. The preferred electron donors are alkyl and cycloalkyl ethers having 2 to 20 carbon atoms; dialkyl, diaryl, and alkylaryl ketones having 3 to 20 carbon atoms; and alkyl, alkoxy, and alkyloalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

The modifier has the formula $BX_3$ or $AlR_{(3-a)}X_a$ wherein each R is an alkyl radical having 1 to 14 carbon atoms and is alike or different; each X is chlorine, bromine, or iodine and is alike or different; and a is 0, 1 or 2. While one or more modifiers can be used, two different modifiers are preferred. Preferred modifiers include alkylaluminum mono- and dichlorides wherein each alkyl radical has 1 to 6 carbon atoms, boron trichloride, and trialkylaluminums. A particularly preferred modifier combination is diethylaluminum chloride and tri-n-hexylaluminum. About 0.1 to about 10 moles, and preferably about 0.2 to about 2.5 moles, of modifier(s) are used per mole of electron donor. When modifiers are used, they are considered to be part of the titanium complex.

The hydrocarbyl aluminum cocatalyst can be represented by the formula $R_3Al$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms.

Examples of hydrocarbyl aluminum compounds are as follows: triisobutylaluminum, trihexylaluminum, di-isobutylaluminum hydride, dihexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred cocatalysts are triethylaluminum, triisobutylaluminum, trihexylaluminum, di-isobutylaluminum hydride, and dihexylaluminum hydride. The trialkylaluminum compounds can also serve as modifiers.

While silica is the preferred support, other suitable supports are inorganic oxides such as aluminum phosphate, alumina, silica/alumina mixtures, silica modified with an organoaluminum compound such as triethylaluminum, and silica modified with diethylzinc. A typical support is a solid, particulate, porous material essentially inert to the polymerization. It is used as a dry powder having an average particle size of about 10 to about 250 microns and preferably about 30 to about 100 microns; a surface area of at least about 200 square meters per gram and preferably at least about 250 square meters per gram; and a pore size of at least about 80 Angstroms and preferably at least about 200 Angstroms. Generally, the amount of support used is that which will provide about 0.1 to about 0.5 millimole of titanium per gram of support and preferably about 0.2 to about 0.3 millimole of titanium per gram of support. Impregnation of the above mentioned catalyst into a silica support is accomplished by mixing the comp'ex and silica gel in the electron donor solvent followed by solvent removal under reduced pressure.

The modifiers are usually dissolved in an inorganic solvent such as isopentane and impregnated into the support following impregnation of the titanium based complex, after which the catalyst is dried. The cocatalyst is preferably added separately neat or as a solution in an inert solvent, such as isopentane, to the polymerization reaction at the same time as the flow of the ethylene is initiated.

Useful molar ratios are about as follows:

| Titanium based catalyst | Broad | Preferred |
|---|---|---|
| 1. Mg:Ti | 0.5:1 to 56:1 | 1.5:1 to 5:1 |
| 2. Mg:X | 0.005:1 to 28:1 | 0.075:1 to 1:1 |
| 3. Ti:X | 0.01:1 to 0.5:1 | 0.05:1 to 0.2:1 |
| 4. Mg:ED | 0.005:1 to 28:1 | 0.15:1 to 1.25:1 |
| 5. Ti:ED | 0.01:1 to 0.5:1 | 0.1:1 to 0.25:1 |
| 6. modifier:Ti | 0.5:1 to 50:1 | 1:1 to 5:1 |

The polymerization is conducted in the gas phase in a fluidized bed made up of particulate EPDM. The fluidized bed reactor can be operated at a temperature in the range of about 0° C. to about 60° C. and is preferably operated in the range of abut 10° C. to about 50° C. A superficial velocity of about 1 to about 4.5 feet per second and preferably about 1.5 to about 3.5 feet per second can also be used in the fluidized bed. The total reactor pressure can be in the range of about 150 to about 450 psia and is preferably in the range of about 250 to about 350 psia. The ethylene partial pressure can be in the range of about 10 psi to about 150 psi and is preferably in the range of about 10 psi to about 80 psi. The gaseous feed streams of ethylene, propylene, and hydrogen are preferably fed to the reactor recycle line while liquid ethylidene norbornene and the cocatalyst solution are preferably fed directly to the fluidized bed reactor to enhance mixing and dispersion. Feeding liquid streams into the reactor recycle line can cause a rapid buildup of a fouling layer resulting in very poor reactor operation. The catalyst is preferably injected into the fluidized bed as a solid or a mineral oil slurry. The EPDM composition can be varied by changing the propylene/ethylene molar ratio in the gas phase and the diene concentration in the fluidized bed. The product is continuously discharged from the reactor as the bed level builds up with polymerization. The production rate is controlled by adjusting the catalyst feed rate.

The molar ratio of propylene to ethylene is in the range of about 1.5:1 to about 5:1 and is preferably in the range of about 2.5:1 to about 3.5:1. The propylene/ethylene molar ratio is adjusted to control the level of propylene incorporated into the terpolymer. The molar ratio of hydrogen to ethylene is in the range of about 0.001:1 to about 0.1:1 and is preferably in the range of about 0.002:1 to about 0.06:1. The hydrogen/ethylene molar ratio is adjusted to control average molecular weights. The level of ethylidene norbornene in the bed is in the range of about 1.5 to about 15 percent by weight based on the weight of the bed and is preferably in the range of about 2 to about 10 percent by weight.

Several steps can be taken, in addition to temperature control, to prevent agglomeration of the elastomeric polymer. The product discharge line between the reactor and the product pot is often plugged up with chunks between intervals of product drops. A continuous purge flow of nitrogen in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, quick change of gas composition, selective use of static-neutralizing chemicals and surface passivation with aluminum alkyls.

It is preferred to control the static in the reactor system during start-up. If the static is not controlled, static induced layers of catalyst rich fines can form on the reactor surfaces. These fines may, in turn, induce localized hot spots and the formation of chunks. Reactor surface passivation with an aluminum alkyl minimizes the formation of fines layers. This is accomplished by first building up the aluminum alkyl concentration in the start-up bed to about 300 to 1000 ppm based on the weight of the bed, and then fluidizing the bed with purified nitrogen or ethylene for several hours. At the end of this passivation period, the reactor is purged while maintaining the circulation, the reaction conditions are established, and the reaction is kicked off by feeding catalyst into the system. If static still persists, additional purges or selective use of static neutralizing chemicals may become necessary to essentially remove all of the static.

The residence time of the mixture of resin, catalyst, and liquid in the fluidized bed can be in the range of about 1.5 to about 8 hours and is preferably in the range of about 3 to about 6 hours. The final EPDM product contains the following amounts of reacted comonomer:

about 50 to about 80 percent by weight ethylene; about 18 to about 50 percent by weight propylene; and about 2 to about 10 percent by weight ethylidene norbornene. The crystallinity, also in weight percent based on the total weight of the EPDM, can be in the range of zero (essentially amorphous) to about 15 percent by weight, and is preferably in the range of 0 to about 10 percent by weight. The Mooney viscosity can be in the range of about 20 to about 150 and is preferably about 30 to about 100. The Mooney viscosity is measured by introducing the EPDM into a vessel with a large rotor, preheating for one minute at 100° C., and then stirring for four minutes at the same temperature. The viscosity is measured at 100° C. in the usual manner.

The EPDM of this invention is a product of the above described process, about 20 to about 50 percent by weight of the total terpolymer chains of the EPDM containing less than about 15 percent by weight of the total moieties based on ENB. Preferably this portion of the terpolymer chains contains less than about 12 percent by weight of the ENB moieties. A preferred EPDM comprises terpolymer chains of which about 20 to about 30 percent by weight contain less than about 15, or even 12, percent by weight of the total moieties based on ENB. The EPDM can be further characterized in that when it is sulfur cured, the EPDM terpolymer partially dissolves when refluxed with xylene, the dissolved portion being in the range of about 20 to about 50 percent by weight based on the total weight of the terpolymer. The high percentage of the dissolved portion of the EPDM of this invention is in marked contrast to commercial EPDM's, which, when sulfur cured and refluxed in xylene, are over 90 percent by weight insoluble. In a preferred EPDM terpolymer, the dissolved portion is in the range of about 20 to about 30 percent by weight.

The advantages of the gas phase fluidized bed process over solution, suspension or other gas phase processes are: (i) simplicity; (ii) elimination of solvent or diluent; (iii) superior product properties; (iv) high catalyst productivity; (v) elimination of catalyst residue removal step; (vi) EPDM granular products can be directly transferred to either pelleting or bailing after residual monomer gas purging; (vii) process can be operated at lower temperatures while maintaining a reasonable catalyst productivity; and (viii) capability of producing products having a broad range of molecular weights, particularly those of high molecular weight.

A typical fluidized bed reactor is described in U.S. Pat. No. 4,482,687, which is incorporated by reference herein.

EXAMPLES 1 AND 2

The catalyst was prepared as follows: A magnesium chloride/titanium chloride/tetrahydrofuran (THF) complex was impregnated into a triethylaluminum (TEAL) treated silica support from a precursor solution of THF. The silica was first dried at 600° C. to remove water and most of the surface silanols, and chemically treated with TEAL to further passivate the remaining silanols. The dried free flowing precursor/support was then further reduced with diethyl aluminum chloride (DEAC) and tri-n-hexyl aluminum (TnHAL) in isopentane solution and dried to become the finished catalyst.

The polymerization was conducted in a continuous gas phase fluidized bed reactor. The fluidized bed was made up of EPDM particles. The gaseous feed streams of ethylene, propylene, and hydrogen were fed to the reactor cycle line. Liquid ethylidene norbornene (ENB) and cocatalyst solutions were fed directly into the fluidized bed reactor to enhance mixing and dispersion. The catalyst was introduced into the fluidized bed as solid particles using purified nitrogen as a carrier gas. A continuous purge flow of nitrogen was maintained in the product discharge line. A static probe was installed in the reactor to monitor static level.

Reaction conditions, catalyst analysis, and EPDM properties are set forth in Table I.

TABLE I

| | Example 1 | Example 2 |
|---|---|---|
| Reaction Conditions | | |
| Temperature (°C.) | 30 | 20 |
| Total reactor pressure (psia) | 315 | 315 |
| ethylene (partial pressure) (psi) | 46 | 37 |
| ENB (weight % in bed) | 5.5 | 8.8 |
| $C_3/C_2$ (molar ratio) | 2.5 | 3.1 |
| $H_2/C_2$ (molar ratio) | 0.056 | 0.042 |
| modifier | DEAC/TnHAL | DEAC/TnHAL |
| cocatalyst | TEAL | TEAL |
| cocatalyst concentration (ppm) | 350 | 350 |
| superficial velocity (feet per second) | 2.0 | 2.0 |
| reactor bed diameter (inches) | 13.25 | 13.25 |
| bed height (feet) | 5 | 5 |
| bed weight (pounds) | 90 | 90 |
| Catalyst Analysis (weight percent) | | |
| titanium | 1.10 | 1.0 |
| magnesium | 1.70 | 1.70 |
| aluminum | 3.25 | 3.25 |
| chloride | 9.6 | 9.6 |
| THF | 13.0 | 13.0 |
| silica | 71.35 | 71.35 |
| | 100.00 | 100.00 |
| EPDM Properties (uncured) | | |
| $C_3$ (weight percent) | 33.2 | 40.0 |
| ENB (weight percent) | 3.4 | 4.5 |
| catalyst ash (weight percent) | 0.148 | 0.193 |
| residual titanium (ppm) | 23.3 | 27.8 |
| Mooney viscosity | 40 | 90 |
| crystallinity (wt %) | 11.0 | 6.5 |
| tensile modulus (psi) | 2950 | 640 |
| tensile strength (psi) | 1150 | 660 |
| elongation (%) | 1300 | 1500 |

EXAMPLE 3

When the EPDM prepared by subject process was cured, with sulfur, it contained an appreciable amount of polymer that could be extracted when refluxed in xylene. The extracted fraction was found by nuclear magnetic resonance to contain very little incorporated ethylidene norbornene. This portion of the EPDM did not undergo curing, but acts as a plasticizer for the balance of the EPDM, which does undergo curing, and significantly enhances the mechanical properties of the EPDM. It can be seen that the EPDM in product form displays better toughness (tensile strength), elongation, and resilience (compression set) than commercial EPDM products of comparable composition.

It is also found that EPDM products made with EPDM produced by subject process require much less energy to process. Thus, in compounding the EPDM produced by subject process with about 20 to about 30 percent by weight fillers, the EPDM can be easily processed at about 130° C. whereas it is necessary to use a temperature of about 170° C. in order to achieve proper mixing of analogous commercial EPDM products.

A comparison of two different EPDM's (A and B) made with subject process and two commercial EPDM's, Royalene 539 (C) and Royalene 552 (D) (Royalene is a trademark of Uniroyal), follows in Table II. Mechanical properties before and after curing are shown. The after cure properties are shown in parentheses.

The following formulation was cured at 160° C. for 20 minutes:

| Components | Parts by Weight |
|---|---|
| EPDM | 150 |
| zinc oxide | 7.5 |
| stearic acid | 1.5 |
| tetramethylthiurammonosulfide (TMTM) | 2.25 |
| mercaptobenzothiazole (MBT) | 0.75 |
| sulfur | 2.25 |

TABLE II

|  | A | B | C | D |
|---|---|---|---|---|
| Mooney viscosity | 50 | 90 | 110 | 83 |
| ENB (wt. %) | 5.1 | 5 | 4.1 | 4.6 |
| $C_3$ (wt. %) | 33 | 33 | 21 | 24 |
| crystallinity (wt %) | 7.5 | 11.5 | 11 | 13 |
| tensile modulus (psi) | 640 (1570) | 940 (1540) | 1480 (1630) | 1200 (1300) |
| tensile modulus, 100% (psi) | 130 (320) | — (360) | 300 (320) | 270 (400) |
| tensile strength (psi) | 660 (1430) | 1140 (2180) | 900 (1370) | 850 (1100) |
| elongation (%) | 1500 (950) | 1310 (1100) | 850 (470) | 1215 (430) |

Notes to Tables

1. The weight percent of ENB in the bed is based on the total bed weight
2. The parts per million (ppm) of cocatalyst concentration is based on the total bed weight
3. The superficial velocity is the velocity of the mixture of gases
4. Weight percent of $C_3$, ENB incorporated into the EPDM, and catalyst ash and ppm of residual titanium are based on the weight of the EPDM.
5. Mooney viscosity is described above
6. Crystallinity (weight %) is the weight of crystalline EPDM based on the total weight of the EPDM It is determined using a duPont Differential Scanning Calorimeter
7. ENB (weight %) is the weight of the ethylidene norbornene incorporated into the EPDM based on the weight of the EPDM
8. Tensile modulus (psi) is determined under ASTM 412, Method D
9. Tensile modulus, 100% (psi) is determined under ASTM 412, Method D.
10. Tensile strength (psi) is determined under ASTM 412, Method D.
11. Elongation (%) is determined under ASTM D-638.

We claim:

1. A process for producing an EPDM wherein about 20 to about 50 percent by weight of the terpolymer chains contain less than about 15 percent by weight of the total moieties based on ethylidene norbornene comprising reacting ethylene, propylene, ethylidene norbornene, and hydrogen, in the gas phase, in a fluidized bed, under polymerization conditions, in the presence of a catalyst system comprising:

(a) a titanium based catalyst having the formula $Mg_aTi(OR)_bX_c(ED)$ wherein

R is an aliphatic or aromatic hydrocarbon radical having 1 to 14 carbon atoms or COR' wherein R' is an aliphatic or aromatic hydrocarbon radical having 1 to 14 carbon atoms;

each OR group is the same or different;

each X is independently chlorine, bromine, or iodine

ED is an electron donor, which is an organic liquid Lewis base in which the precursors of the titanium based catalyst are soluble;

a is 0.5 to 56;

b is 0, 1, or 2;

c is 2 to 116; and d is greater than 1.5 a+2;

(b) at least one modifier having the formula $BX_3$ or $AlR_{(3-b)}X_b$ wherein each R is alkyl or aryl and is the same or different, and X and b are as defined above for component (a), wherein components (a) and (b) are impregnated into an organic support; and (c) a hydrocarbyl aluminum cocatalyst with the following provisos:

(i) the partial pressure of ethylene is in the range of about 10 to about 80 psi;

(ii) the molar ratio of propylene to ethylene is in the range of about 2.5:1 to about 3.5:1;

(iii) the molar ratio of hydrogen to ethylene is in the range of about 0.002:1 to about 0.06:1;

(iv) the amount of ethylidene norbornene is about 2 to about 10 percent by weight based on the weight of the fluidized bed; and (v) the polymerization temperature is in the range of about 0° C. to about 60° C.

2. The process defined in claim 1 wherein, in the catalyst system, the electron donor is tetrahydrofuran and the modifier is diethylaluminum chloride or tri-n-hexylaluminum, or a mixture of both.

3. The process defined in claim 1 wherein about 20 to about 30 percent by weight of the terpolymer chains of the EPDM contain less than about 15 percent by weight of the total moieties based on ethylidene norbornene.

4. The process defined in claim 1 wherein the EPDM produced by the process is cured.

5. The process defined in claim 1 wherein the EPDM contains about 50 to about 80 percent by weight ethylene moieties; about 18 to about 50 percent by weight propylene moieties; and about 2 to about 10 percent by weight ethylidene norbornene moieties.

6. The process defined in claim 1 run in the continuous mode.

* * * * *